US 8,243,924 B2
Aug. 14, 2012

(12) United States Patent
Chen et al.

(10) Patent No.: US 8,243,924 B2
(45) Date of Patent: Aug. 14, 2012

(54) PROGRESSIVE DOWNLOAD OR STREAMING OF DIGITAL MEDIA SECURELY THROUGH A LOCALIZED CONTAINER AND COMMUNICATION PROTOCOL PROXY

(75) Inventors: Hao-Nong Chen, Issaquah, WA (US); Michael Rutman, Gainesville, FL (US); Charles Duncan MacLean, Claremont, CA (US); Edward Charles Hiar, Lynnwood, WA (US); Glenn A. Morten, Bellevue, WA (US)

(73) Assignee: Google Inc., Mountain View, CA (US)

( * ) Notice: Subject to any disclaimer, the term of this patent is extended or adjusted under 35 U.S.C. 154(b) by 788 days.

(21) Appl. No.: 12/137,507

(22) Filed: Jun. 11, 2008

(65) Prior Publication Data

US 2009/0003600 A1   Jan. 1, 2009

Related U.S. Application Data

(60) Provisional application No. 60/947,263, filed on Jun. 29, 2007.

(51) Int. Cl.
*H04N 7/167* (2011.01)
(52) U.S. Cl. ........................................ 380/217
(58) Field of Classification Search ............ 380/217
See application file for complete search history.

(56) References Cited

U.S. PATENT DOCUMENTS

| | | |
|---|---|---|
| 4,535,355 A | 8/1985 | Arn et al. |
| 4,694,489 A | 9/1987 | Frederiksen |
| 5,067,035 A | 11/1991 | Kudelski et al. |
| 5,134,656 A | 7/1992 | Kudelski et al. |
| 5,144,663 A | 9/1992 | Kudelski et al. |
| 5,339,413 A | 8/1994 | Koval et al. |
| 5,375,168 A | 12/1994 | Kudelski et al. |
| 5,487,167 A | 1/1996 | Dinallo et al. |
| 5,539,450 A | 7/1996 | Handelman et al. |

(Continued)

FOREIGN PATENT DOCUMENTS

EP           0658054 B1    6/1995
(Continued)

OTHER PUBLICATIONS

"Broadband Streaming: Omneon and BSkyB," Omneon Video Networks, Product Announcement, TB-1006-1, 1998, 4 pages.

(Continued)

*Primary Examiner* — Kambiz Zand
*Assistant Examiner* — Stephen Sanders
(74) *Attorney, Agent, or Firm* — Frommer Lawrence & Haug LLP; John W. Branch

(57) ABSTRACT

Various embodiments are directed towards employing a container and communication protocol proxy component within a client device to receive securely real-time streamed, progressively downloaded, or adaptively streamed container over a network using one container and communication protocol, and to securely decrypt the container and provide it to a media player using a different container and communications protocol. In one embodiment, the container is in Flash Video (FLV) file format. A browser or the media player on the client device may be used to request the container. The requested container is sent over one communication protocol and intercepted by the container and communication protocol proxy component. The container may be received as selectively encrypted container. The container and communication protocol proxy component then may enable decryption of the container and providing of it to the media player using another container and communication protocol combination.

21 Claims, 4 Drawing Sheets

U.S. PATENT DOCUMENTS

| | | |
|---|---|---|
| 5,590,200 A | 12/1996 | Nachman et al. |
| 5,592,212 A | 1/1997 | Handelman et al. |
| 5,613,002 A | 3/1997 | Kephart et al. |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies et al. |
| 5,920,861 A | 7/1999 | Hall et al. |
| 5,922,208 A | 7/1999 | Demmers et al. |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt et al. |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,157,721 A | 12/2000 | Shear et al. |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,327,652 B1 | 12/2001 | England et al. |
| 6,334,213 B1 | 12/2001 | Li |
| 6,363,488 B1 | 3/2002 | Ginter et al. |
| 6,389,402 B1 | 5/2002 | Ginter et al. |
| 6,405,369 B1 | 6/2002 | Tsuria et al. |
| 6,409,080 B2 | 6/2002 | Kawagishi et al. |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,516,357 B1 | 2/2003 | Hamann et al. |
| 6,587,561 B1 | 7/2003 | Sered et al. |
| 6,591,365 B1 | 7/2003 | Cookson |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelman et al. |
| 6,640,304 B2 | 10/2003 | Ginter et al. |
| 6,651,170 B1 | 11/2003 | Rix et al. |
| 6,654,420 B1 | 11/2003 | Snook et al. |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,729,549 B2 | 5/2004 | Hamann et al. |
| 6,941,285 B2 | 9/2005 | Sarcanin et al. |
| 7,085,931 B1 | 8/2006 | Smith et al. |
| 7,246,356 B1 | 7/2007 | Lozben et al. |
| 2001/0008015 A1 | 7/2001 | Vu et al. |
| 2002/0001385 A1 | 1/2002 | Kawada et al. |
| 2002/0015498 A1 | 2/2002 | Houlberg et al. |
| 2002/0021805 A1 | 2/2002 | Schumann et al. |
| 2002/0089410 A1 | 7/2002 | Janiak et al. |
| 2002/0104004 A1 | 8/2002 | Couillard |
| 2002/0108037 A1 | 8/2002 | Baker |
| 2002/0141582 A1 | 10/2002 | Kocher et al. |
| 2002/0147923 A1 | 10/2002 | Dotan |
| 2003/0007568 A1 | 1/2003 | Hamery et al. |
| 2004/0078470 A1 | 4/2004 | Baumeister et al. |
| 2004/0117500 A1* | 6/2004 | Lindholm et al. ............ 709/231 |
| 2004/0151315 A1 | 8/2004 | Kim |
| 2005/0120125 A1 | 6/2005 | Morten et al. |
| 2005/0257266 A1 | 11/2005 | Cook et al. |

FOREIGN PATENT DOCUMENTS

| | | |
|---|---|---|
| EP | 0714204 B1 | 5/1996 |
| EP | 0852445 A2 | 7/1998 |
| EP | 0886409 A2 | 12/1998 |
| EP | 1182875 A2 | 2/2002 |
| JP | 2001-144802 | 5/2001 |
| JP | 2002-084339 | 3/2002 |
| JP | 2004-048772 | 2/2004 |
| WO | WO-96/06504 A1 | 2/1996 |
| WO | WO-96/32702 A1 | 10/1996 |
| WO | WO-99/21364 A1 | 4/1999 |
| WO | WO-99/28842 A1 | 6/1999 |
| WO | WO-99/30499 A1 | 6/1999 |
| WO | WO-99/54453 A1 | 10/1999 |
| WO | WO-01/35571 A1 | 5/2001 |
| WO | WO-01/93212 A2 | 12/2001 |
| WO | WO-02/21761 A2 | 3/2002 |
| WO | WO-02/084980 A1 | 10/2002 |
| WO | 03/028330 A2 | 4/2003 |
| WO | WO-03/092264 | 11/2003 |
| WO | 03/101073 A1 | 12/2003 |
| WO | WO-04/002112 A1 | 12/2003 |

OTHER PUBLICATIONS

"Establishing Interconnectivity Among Various Makers' Products Through Standardization of VOD Protocol," NTT Corporation Press Release, Sep. 27, 2002, http://www.ntt.co.jp/news/news02e/0209/020927.html.

"Irdeto Access and Optibase Create Strategic Alliance—Dec. 14, 2000," Press Release, Irdeto Access, Dec. 14, 2000, 4 pages, http://www.irdetoaccess.com/press/0000041.htm.

"Irdeto Access and Optibase Create Strategic Alliance", Press Release, Optibase, Dec. 14, 2000, 2 pages, http://www.optibase.com/html/news/December_14_2000.html (accessed Nov. 13, 2003).

Baker, Brian et al., "Taking a DIFFERENT Path—The Application of Virtual Smart Card Technology to Interactive TV," Communications Engineering & Design, Aug. 2003, 5 pages, http://testced.cahners1.com/ced/2003/0803/08b.htm (accessed Oct. 18, 2004).

Bathtrop, Justin, et al., "Coverage and Generalization in an Artificial Immune System," Proceedings of Genetic and Evolutionary Computation Conference (GECCO), 2002, 8 pages.

Blumenfeld, Steven M., "System Security," Broadcast Engineering magazine, Oct. 2001, 2 pages.

Cheng, Howard Chi Ho, "Partial Encryption for Image and Video Communication," Department of Computing Science, University of Alberta, Master's Thesis, Fall 1998, 94 pages.

Eskicioglu, Ahment M. et al., "An Overview of Multimedia Content Protection in Consumer Electronics Devices," Signal Processing: Image Communication, Apr. 2001, 16(7):681-699.

European Patent Application No. 00986215.2, Official Communication dated Dec. 6, 2006.
European Patent Application No. 05250968.4, Official Communication dated Jan. 26, 2006.
European Search Report dated Oct. 12, 2005 for European Patent Application No. 05250968.4.
Forrest, S., "Research Projects," Dec. 2, 2003, 3 pages, http://www.cs.unm.edu/~forrest/projects.html.
Friedman, Menahem et al., *Introduction to Pattern Recognition: Statistical, Structural, Neural and Fuzzy Logic Approaches*, (Imperial College Press), 1999, title page, publisher's information page, p. 4.
Goonatilake, S. et al., *Intelligent Systems for Finance and Business* (John Wiley & Sons Ltd) 1995, chapters 2-10: pp. 31-173.
Griwodz, Carsten et al., "Protecting VoD the Easier Way," ACM Multimedia 1998, Bristol, UK, Sep. 1998, 8 pages.
Griwodz, Carsten, "Video Protection by Partial Content Corruption," Multimedia and Security Workshop at ACM Multimedia, Bristol, UK, Sep. 1998, 5 pages.
Hanushevsky, Andrew et al. "Virtual Smart Card," Stanford Linear Accelerator Center, Powerpoint Presentation, Dec. 13, 2002, 12 pages.
Hunter, Jane et al., "A Review of Video Streaming Over the Internet," DSTC Technical Report TR97-10, Aug. 1997, 28 pages.
International Search Report and Written Opinion mailed May 24, 2007 for International Patent Application No. PCT/US05/31353.
International Search Report and Written Opinion mailed Nov. 13, 2006 for International Patent Application No. PCT/IB05/01718.
Schulzrinne, H. et al., "Real Time Streaming Protocol (RTSP)," RFC 2326, Apr. 1998, 86 pages (accessed Mar. 30, 2004).
Schulzrinne, H. et al., "RTP: A Transport Protocol for Real-Time Applications," RFC 1889, Jan. 1996, 75 pages.
Spanos, George A. et al., "Performance Study of a Selective Encryption Scheme for the Security of Networked, Real-Time Video," Proceedings of the 4th International Conference on Computer Communications and Networks (ICCCN '95), Sep. 1995, pp. 2-10.
Wu, Tsung-Li et al., "Selective Encryption and Watermarking of MPEG Video," International Conference on Image Science, Systems, and Technology, CISST'97, Sep. 1997, 10 pages.
Yoshida, Kazuhiro, et al., "A Continuous-media Communication Method for Minimizing Playback Interruptions," IS&T/SPIE Conference on Visual Communications and Image Processing '99, SPIE, Jan. 1999, SPIE vol. 3653:748-757.
"Real Time Messaging Protocol," Wikipedia—the free encyclopedia, 3 pages, http://en.wikipedia.org/w/index/php!title=Real_Time_Messaging_Pr... (accessed Aug. 18, 2008).
International Search Report and Written Opinion for International Patent Application No. PCT/US2008/068583 mailed Oct. 2, 2008.
International Report on Patentability for International Patent Application No. PCT/US2008/068583 mailed Jan. 14, 2010.
Official Communication for British Application No. GB1001196.3 mailed Aug. 30, 2011.
Official Communication for British Application No. GB1001196.3 mailed Dec. 23, 2011.
Patents Act 1977: Examination Report under Section 18(3) for British Application No. GB1001196.3 mailed May 3, 2012.

* cited by examiner

PROGRESSIVE DOWNLOAD OR STREAMING OF DIGITAL MEDIA SECURELY THROUGH A LOCALIZED CONTAINER AND COMMUNICATION PROTOCOL PROXY

CROSS-REFERENCE TO RELATED APPLICATIONS

This application claims the benefit of U.S. Provisional Application Ser. No. 60/947,263 filed on Jun. 29, 2007, entitled "Progressive Http Download or Streaming of Digital Media Securely Through a Localized Real Time Messaging Protocol Proxy," the benefit of the earlier filing date of which is hereby claimed under 35 U.S.C. §119(e) and 37 C.F.R. §1.78, and is further incorporated herein by reference.

TECHNICAL FIELD

This invention relates generally to digital container and communication protocols, and more particularly but not exclusively, to enabling the use of a first container, and first communication protocol and to securely and progressively download steaming digital media using a second container and second communication protocol, by employing a client based container and protocol proxy device.

BACKGROUND

Of all the industries that have been revolutionized by the rise of digital technology and the Internet, few have been swept so greatly as the "content" industries, such as producers and providers of music, movies, pay per view (PPV), Video on Demand (VoD), interactive media, and the like. The Internet has made widespread distribution of such content easier than ever. The content delivered over the Internet may be provided in a variety of containers. One such popular container for video and/or audio content is known as the Flash Video format container or FLV. One of the reasons for its popularity is because it is viewable on most operating systems through a readily available FLV media player. These media players may often be easily, and sometimes freely, downloaded and integrated into a web browser as a plug-in.

In a traditional configuration, a server is employed to enable a client's media player to request the FLV container to be downloaded over the Internet, to be played on the client device. Several traditional configurations currently exist to enable the FLV container to be streamed to the client device, including those that use of a proprietary communication protocol known as Real Time Messaging Protocol (RTMP), developed by Adobe Systems (formerly developed by Macromedia). The FLV container may also be streamed using RTMP wrapped within the HTTP communications protocol. Using RTMP, the FLV container may also be streamed as an encrypted file to the client device's media player. However, use of the RTMP protocol has often resulted in an expensive server configuration, thereby limiting the use of the RTMP as a mechanism to stream FLV container in some environments.

Using HTTP to stream or progressively download FLV container to the client device's media player, while currently less expensive, sometimes results in exposing the content to a security risk. This is because in today's configuration, even though the FLV container may be transported over network from the server as an encrypted file, the decrypted FLV container may be exposed, or in the clear on the client device. Such exposure enables the FLV container to be improperly copied and/or distributed. Thus, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION

Figure 1:
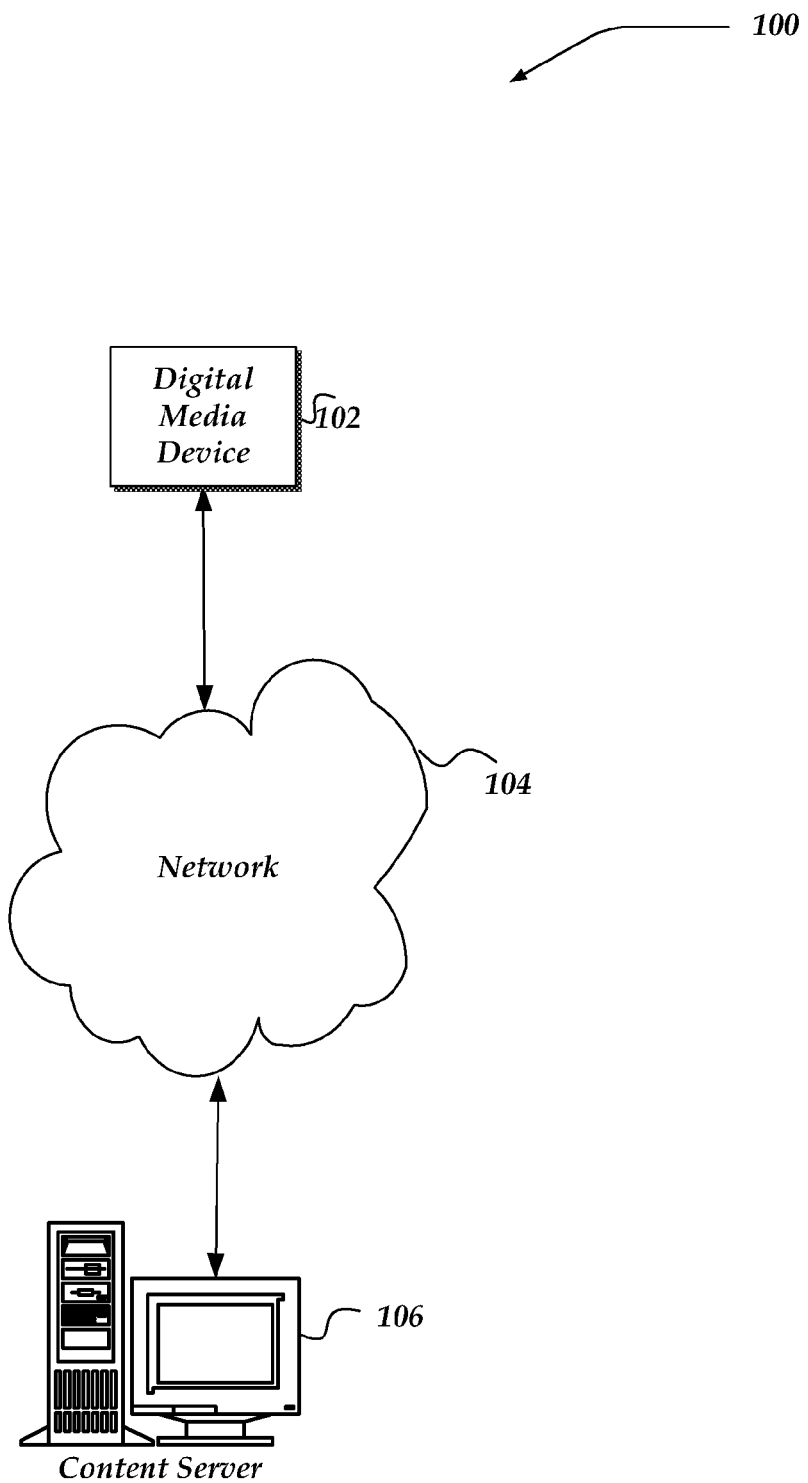
FIG. 1 shows a functional block diagram illustrating an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. The meaning of "a," "an," and "the" include plural references. The meaning of "in" includes "in" and "on."

As used herein, the term "content" includes any digital data that may be communicated over a network to be used by a computing device. Non-exhaustive examples of content include but is not limited to multimedia data, including movies, videos, music, Pay Per View (PPV), Video On Demand (VoD), interactive media, audios, still images, text, graphics, scripts, applications, and other digital content useable by a computing device. Content is often described by its format, or container, in which the content is provided. Thus, as used here, the term "container" refers to a computer file or stream format in which content may be presented. Containers often disclose how the digital content is encoded, interleaved, and/or compressed. A non-limiting and non-exhaustive list of examples of a container is: MPEG2-TS, FLV, H.264, MOV, MP4, 3GP, and ASF.

As used here, the terms "communication protocol" or "protocol" refer to a convention or standard that controls or enables a connection, communication, and/or data transfer between two computing endpoints. Thus, a communication protocol can be defined as rules governing the syntax, semantics, and synchronization of communication over a network. A communication protocol is employed to transport content within its container over a digital computer network. A non-limiting and non-exhaustive list of examples of a communication protocol is: Real Time Messaging Protocol (RTMP), RTMPE, User Datagram Protocol (UDP), Hypertext Transfer Protocol (HTTP), Transmission Control Protocol (TCP)/Internet Protocol (TCP/IP, File Transfer Protocol (FTP), Secure Copy Protocol (SCP), Real-time Transport Protocol (or RTP) and Real Time Streaming Protocol (RTSP). Moreover, a communications protocol may be unicast or multicast.

As used here, the term "proxy" refers to any software and/or hardware component useable to operate on behalf of other network components to manage conversion and/or pass through of a transmission between the network components, the proxy being interposed between the network components. Thus, the proxy is configured to receive a transmission from one network component that is destined for another network component. The proxy evaluates the transmission and converts one or more characteristics of the transmission and/or allows one or more characteristics of the transmission to be forwarded without a conversion.

Briefly, the present invention is directed towards a method, apparatus, and system that employ a proxy component within a client device to receive securely downloaded content over a network using a first container and communications protocol, and to securely decrypt the content and provide it to a media player using a second container and second communications protocol. In one embodiment, the container is downloaded using any of a variety of mechanisms including but not limited to streaming the container over the network. Moreover, the streaming of the data may be performed using a variety of mechanisms. Thus, in one embodiment, the streaming may employ a progressive download streaming, or fast start approach, that enables a received portion of the data to be played while other portions of the data are still being streamed. However, other mechanisms may also be employed, including, but not limited to real-time streaming, broadcasting, PHP Hypertext pre-preprocessing streaming, or any of a variety of adaptive streaming mechanisms, random access, seek, bookmark approaches, or the like. Changes in an encoding or compression of the container may also be used. A request for the container may be provided to a content server using a web browser, or the like. In one embodiment, the media player may be used to provide the request for the container. In one embodiment, the request might be redirected through the proxy component and sent to the content server using a first container and communications protocol. In one embodiment, the first container may be FLV and the first communications protocol is HTTP. However, the invention is not so limited. For example, the first container might also be MPEG2-TS and the first communication protocol Real-time Transport Protocol (or RTP), or any of a variety of other protocols useable to distribute multimedia content in containers over a network. In one embodiment, the content is selectively encrypted and placed in any of a variety of containers, including, but not limited to Windows Media Video Format (WMV), Windows Media Audio Format (WMA), Advanced Systems Format (ASF), Real Audio (RA/RAM), MPEG-4 MOV, H.264 or the like, without departing from the scope of the invention.

In one embodiment the containers are communicated over the network using any communication protocol, including, but not limited to RTMP, RTPME, UDP, HTTP, TCP/IP, FTP, SCP, RTP, or RTSP. The proxy component may then receive at least a portion of the container, decrypt at least some of the received container, and provide the decrypted portion to the media player, virtually on-the-fly (or virtually real-time), and further proxy(convert) the data using a second container and second communications protocol,. A non-limiting and non-exhaustive list of containers includes: MPEG2-TS, FLV, H.264, MOV, MP4, 3GP, and ASF. A non-limiting and non-exhaustive list of examples of a communications protocol includes: RTMP, RTPME, UDP, HTTP, TCP/IP, FTP, SCP, RTP, and RTSP.

In one embodiment, the encrypted portion of the received container may be securely stored in a data store, secure cache, or the like, on the client device. Thus, the proxy may convert from any one of the containers to any one of the other containers. The proxy may also convert from any one of the communications protocols to any one of the other communication protocols. It should be noted, however, that the proxy may also allow a first container or first communication protocol to be a second container or second communication protocol. Thus, in one embodiment, the proxy might select to convert a first container to a second container, where the first and second containers are different, but select to maintain the same communications protocol during the conversion. That is, in one embodiment, the proxy might maintain the first and second communications protocols to be the same communications protocol. Similarly, the proxy may select to convert a first communications protocol to a second communications protocol, where the first and second communications protocol are different, but select to maintain the same container for both the first and second containers.

Illustrative Environment

FIG. 1 is a functional block diagram illustrating an exemplary operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes a digital media device 102, a network 104, and a content server 106. Network 104 is coupled to and enables communication between digital media device 102 and content server 106.

One embodiment of digital media device 102 is described in more detail below in conjunction with FIG. 2. Briefly, however, digital media device 102 may include virtually any computing device capable of receiving containers and/or software over a network, such as network 104, from another computing device, such as content server 106. Digital media device 102 may also include any computing device capable of receiving the container and/or software employing other mechanisms, including, but not limited to CDs, DVDs, tape, electronic memory devices, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Digital media device 102 may also be any device that is capable of connecting using a wired or wireless communication medium such as a PDA, POCKET PC, wearable computer, media players, and any other device that is equipped to communicate over a wired and/or wireless communication medium to receive and play the content. Similarly, digital media device 102 may employ any of a variety of devices to enjoy such content, including, but not limited to, a computer display system, an audio system, a jukebox, set top box (STB), a television, video display device, and the like.

Digital media device 102 may further employ virtual smart card (VSC)/Digital Copy Protection (DCP) software as described below. Digital media device 102 may employ the VSC/DCP software, for example, to manage access to content. The VSC/DCP software can be renewed over a network by downloading at least a portion of the VSC/DCP software (including new encryption/decryption keys), or by receiving it via another mechanism. Although a VSC/DCP software component is described in more detail below in conjunction with FIG. 3, it should be clear that virtually any downloadable conditional access software module may also be employed.

Digital media device 102 may further include a browser application that is configured to receive and to send web pages, web-based messages, containers, or the like. The browser application may be configured to receive and display graphics, text, multimedia, or any of a variety of other content, employing virtually any web based language, including but not limited to Standard Generalized Markup Language (SMGL), HyperText Markup Language (HTML), eXtensible Markup Language (XML), or the like. In one embodiment, the browser application may be configured with one or more scripts, applets, plug-ins, or the like, that may be arranged to enable display of content based on the container. Thus, in one embodiment, the browser application may include a media player, or the like, that is configured to play such containers, as FLV, small web format (SWF), MPEG, or the like. The media player may also play a variety of other container formats. Moreover, in another embodiment, the media player or other content player component may be distinct from the browser application.

In one embodiment, the web browser may be configured to access a web page, or the like, over network 104 that may be hosted on a remote computing device, such as content server 106, or the like. A user of digital media device 102 may then select for download containers. The containers may be real-time streamed, progressively downloaded, adaptively downloaded (or downloaded using a variety of other mechanisms) over network 104 to be played within the browser application using the media player. However, it is noted that the media player may also be used to play the container, where the media player is distinct from a browser application. In one embodiment, the container is downloaded over network 104 using HTTP. However, the containers may also be downloaded over network 104 using any of a variety of communication protocols, including but not limited to those mentioned above.

In one embodiment, the containers are encrypted. In one embodiment, the containers may be selectively encrypted. That is, the some portions of the containers may be encrypted using one or more encryption keys, while another portion of the container stream may be unencrypted or left in the clear. Moreover, encryption may be selectively applied to at least a portion of a video elementary stream (ES) of the real-time streamed, progressively, or adaptively downloaded container, a portion of the audio ES, a portion of the digital data ES, and/or any combination and any portion of video, audio, data elementary streams that comprise container stream. Selective encryption may further include selectively encrypting at least a portion of an I-frame, P-frame, B-frame, and any combination of P, B, and I frames within the container stream.

In one embodiment, the media player may be configured to request and/or receive content in a second container type using a second communication protocol, such as the RTMP streaming protocol, or the like. Thus, as described below, in conjunction with FIGS. 2 and 4, a container and communication protocol proxy (CCPP) component may be provided to digital media device 102 that is configured to intercept the selectively encrypted first container, and communication protocol or progressively downloaded stream in a first container and communication protocol and securely decrypt it and provide it to the media player using a second container, such as MP4 and communication protocol such as RTMP, or some other second protocol.

Network 104 is configured to couple one computing device to another computing device to enable them to communicate. Network 104 is enabled to employ any form of computer readable media for communicating information from one electronic device to another. Also, network 104 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 104 includes any communication method by which information may travel between networked devices.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other transport mechanisms and includes any information delivery media. By way of example, communication media includes wired media such as twisted pair, coaxial cable, fiber optics, wave guides, and other wired media and wireless media such as acoustic, RF, infrared, and other wireless media.

Content server 106 includes servers that may be managed for producers, developers, and owners of content that can be distributed to digital media device 102. Such content include pay-for-view or time and subscription television, movies, interactive video games, interactive news television, catalogue browsing, distance learning, video conferencing, and the like. It is apparent that such content owned by content server 106 is not limited to video content only, and may include audio only services, without departing from the scope or spirit of the present invention. Thus, content is intended to include, but not be limited to, audio, video, still images, text, graphics, and other forms of content directed towards a user.

In one embodiment, the content is provided as in a Moving Pictures Experts Group (MPEG) container stream, such as a transport stream, or the like. However, the invention is not so limited, and other file formats may also be employed, without departing from the scope or spirit of the invention. For example, in one embodiment, the container may be provided as FLV file format, MP3 file format, MP4 file format, or the like.

Moreover, the container may be stored on content server 106 and/or distributed to various participants within operating environment 100 as selectively encrypted container. For example, in one embodiment, content server 106 may selectively encrypt at least a portion of the container, while leaving another portion unencrypted. Content server 106 may select to encrypt a video elementary stream (ES), an audio ES, a digital data ES, and/or any combination, and/or any portion of video, audio, data elementary streams of the container. In one embodiment, at least one portion of the container may be selectively encrypted using one container encryption key, while another portion of the container may be selectively encrypted using another container encryption key. It is noted, however, the content server 106 may also select to encrypt the entire container, without departing from the scope or spirit of the invention.

Content server 106 may further select to encrypt at least a portion of the container using any of a variety of encryption techniques, including, but not limited to RSA algorithms, Data Encryption Standard (DES), International Data Encryption Algorithm (IDEA), Skipjack, RC4, Advanced Encryption Standard (AES), Elliptic Curve Cryptography, or the like. Moreover content server 106 may perform such encryption on-the-fly, or store the container as already selectively encrypted.

Content server 106 may provide to a requesting device, such as digital media device 102, or the like, a decryption key that may be used to decrypt the selectively encrypted container, along with container attribute information, rights, and entitlements to access the container. In one embodiment, the decryption key may be encrypted and sent with the encrypted container. In another embodiment, the decryption key may be provided using an out-of-band mechanism. For example, the decryption key may be provided using any of the variety of portable storage devices described below, out-of-band over a network, via a virtual smart card such as to a VSC/DCP, or the like.

In any event, devices that may operate as content server 106 include personal computers, desktop computers, multiprocessor systems, microprocessor-based or programmable consumer electronics, network PCs, servers, or the like. However, content server 106 may also include any of a variety of mobile devices, such as described above in conjunction with digital media device 102, or the like.

Illustrative Digital Media Device

Figure 2:
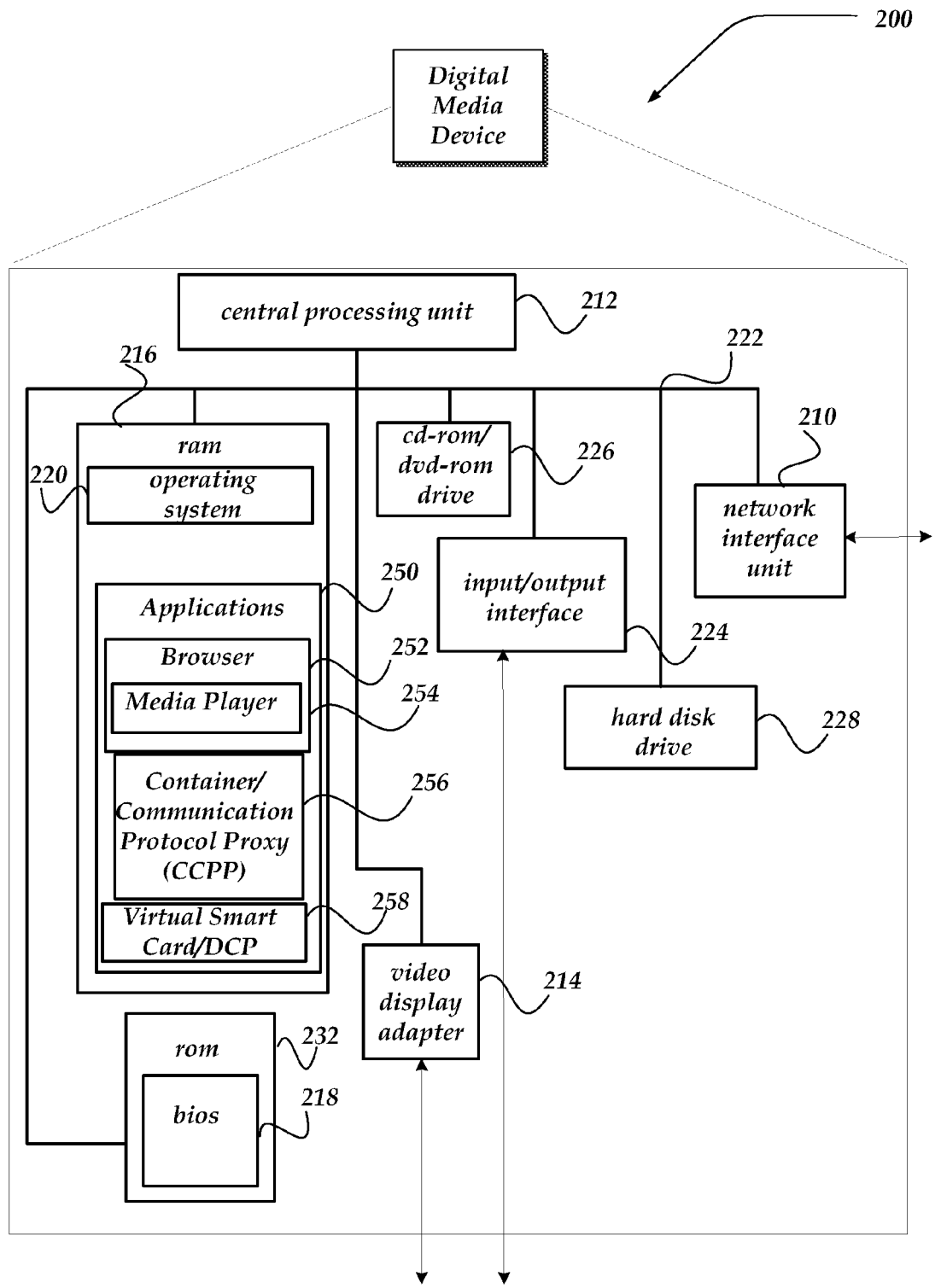
FIG. 2 shows one embodiment of a digital media device that may be employed.

FIG. 2 shows one embodiment of a digital media device that may be employed in the operating environment 100 of FIG. 1. Digital media device 200 may include many more or less components than those shown. The components shown, however, are sufficient to disclose an illustrative embodiment for practicing the invention. Digital media device 200 may represent, for example, one embodiment of digital media device 102 of FIG. 1.

Digital media device 200 includes central processing unit 212, video display adapter 214, and a mass memory, all in communication with each other via bus 222, and input/output interface 224. The mass memory generally includes RAM 216, ROM 232, and one or more permanent mass storage devices, such as cd-rom/dvd-rom drive 226, hard disk drive 228, tape drive, optical drive, and/or floppy disk drive. The mass memory stores operating system 220 for controlling the operation of digital media device 200. Any general-purpose operating system may be employed. Basic input/output system ("BIOS") 218 is also provided for controlling the low-level operation of digital media device 200. As illustrated in FIG. 2, digital media device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer-readable storage media. Computer-readable storage media may include volatile, nonvolatile, removable, and non-removable media implemented in any method or technology for storage of information, such as computer readable instructions, data structures, program modules, or other data. Examples of computer-readable storage media include, but is not limited to RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, CODECs, networking programs, media communication stacks, user interface programs, encryption/decryption programs, security programs, container programs, account management programs, and so forth. Application programs may also include virtual smart card VSC/DCP 258, browser 252, and container and communication protocol proxy or CCPP 256.

One embodiment of VSC/DCP 258 is described in more detail below in conjunction with FIG. 3. Briefly, however, VSC/DCP 258 includes computer-executable code, data, decryption/encryption keys, and the like, that is configured to enable container protection similar to physical smart card approaches. However, unlike the physical smart card approaches, the VSC/DCP 258 is configured as software that may be downloaded to and reside within digital media device 200 to enable changes in security solutions to be implemented rapidly (in seconds, minutes, or hours) at relatively low costs. This is in stark contrast to physical smart card approaches that often require new hardware to be generated and distributed. Such physical approaches typically are made available as updates about once or twice a year. Moreover, use of the VSC/DCP 258 removes physical constraints on container protection layers providing the secure container to a user. For example, by replacing a physical smart card with the VSC/DCP 258, physical interface cards, links, or the like, may be removed. Removal of such physical components from digital media device 200 is directed at improving a channel change time over traditional systems, as well as overall communication performance enhancements positively impacting user experience while viewing content. Use of the described VSC/DCP 258 also enables privacy (confidentiality), integrity, timeliness, access control (authorization), and authentication (identity), as well as rapid renewal, cross link copy protection or digital rights management, and greater capacity, flexibility, and an ability to bind to a device to provide increased security.

Typical VSC/DCP 258 software may include various components including but not limited to secure stores, fingerprinting modules, secure message managers, entitlement managers, key generators, and the like. The VSC/DCP 258, and its components, may be configured to enable protection of received container. In one embodiment, the VSC/DCP 258 may be configured, in part, to generate a decryption key for use in decrypting received container. In another embodiment, the VSC/DCP 258 may receive the decryption key from another device, or component, within the client device, over a network, from a portable memory device, or from a variety of other mechanisms. In one embodiment, VSC/DCP 258 may receive a decryption key, and use the decryption key to decrypt the encrypted container.

Browser 252 may include virtually any client application configured to enable a user to display and interact with text, images, and other information typically located on a network device, such as content server 106 of FIG. 1. Thus, browser 252 may include, but is not limited to, Internet Explorer, Mozilla Firefox, Safari, Opera, Netscape, or the like. As shown, browser 252 may include a plug-in component: media player 254. Media player 254 may represent any of a variety of container players, including those configured to request and/or play FLV container, MPEG, or the like. It should be noted, while media player 254 is illustrated as a plug-in to browser 252, the invention is not so limited. Thus, in one embodiment, media player 254 may be configured and arranged to operate as a standalone application distinct from browser 252.

Container and Communication Protocol Proxy 256 is configured and arranged to intercept requests for containers from media player 254. In one embodiment, the request may be received for FLV containers or any other container such as H.264, MP4, MOV, or the like. Additionally, containers are requested using RTMP, however, the request may also be received using any of a variety of other communication protocols, including, but not limited to RTMPE (encrypted RTMP), RTP, RTSP or the like, As used herein, for convenience, the container and communication protocol used by the media player 254 may be referred to as the second container and protocol. The container and communication protocol that is communicated over the network, such as network 104 of FIG. 1 may then be referred to a the first container and communication protocol. Such terms, clearly are arbitrary, and other naming conventions may also be used, without narrowing the scope of the invention.

In any event, container and communication protocol proxy 256 may then provide the request for containers over a network using the first container and communication protocol, and receive the requested container using the first communication protocol. In one embodiment, the first container may include but is not limited to FLV, H.264 or MOV or the like and the communication protocol may include, but is not limited to HTTP, RTP, UDP, RTSP, RTMP, RTMPE or the like. In one embodiment, the container may be communicated over the network as an MPEG Transport Stream (TS) using User Datagram Protocol (UDP), Transport Control Protocol (TCP), or the like. In one embodiment, container and communication proxy 256 may receive the container as selectively encrypted container. In one embodiment, the container requested is in the FLV file format. However, the invention is not so constrained, and other container file formats may also be used. For example, the container file may also be in the MPEG format, or the like. Moreover, as noted above, the container may be transmitted using a multicast and/or a unicast protocol.

Proxy 256 may receive the container in a container stream. In one embodiment, a portion of the container may be received, and decrypted, while still receiving at least another portion of the container. Thus, in one embodiment, proxy 256 may receive a progressive download of the container stream. Container and Communication Protocol Proxy 256 may then provide the decrypted container to media player 254 using the second container and communication protocol. Thus, container and communication proxy 256 is configured and arranged to convert the first container and communication protocol into the second container and communication protocol, and/or convert the second communication protocol container into the first container and communication protocol. For example, container and communication protocol proxy 256 might convert FLV containers communicated over HTTP into FLV containers communicated over RTMP; H.264 containers communicated over UDP into FLV containers communicated over RTMP; or the like.

In one embodiment, container and communication protocol proxy 256 may include a secure data store that is configured to securely store decrypted and/or encrypted container. In another embodiment, container and communication protocol proxy 256 may employ a secure data store within VSC/DCP 258, or the like, to store received containers, where the container may be provided using any of a variety of streaming mechanisms, including, but not limited to those described above. Container and Communication Protocol Proxy 256 may employ a process such as described in more detail below in conjunction with FIG. 4 to perform at least some of its actions.

While container and communication protocol proxy 256 is shown as a distinct component, the invention is not so limited. For example, in one embodiment, container and communication protocol proxy 256 may be a component within VSC/DCP 258. In another embodiment, container and communication protocol proxy 256 may be downloaded as a separate component, downloaded as a component within VSC/DCP 258, or even configured as a downloadable plug-in to browser 252. Thus, the various embodiments illustrated in the figures are not to be construed as narrowing the invention, and other embodiments, configurations, and arrangements are also envisaged within the scope of the invention.

Figure 3:
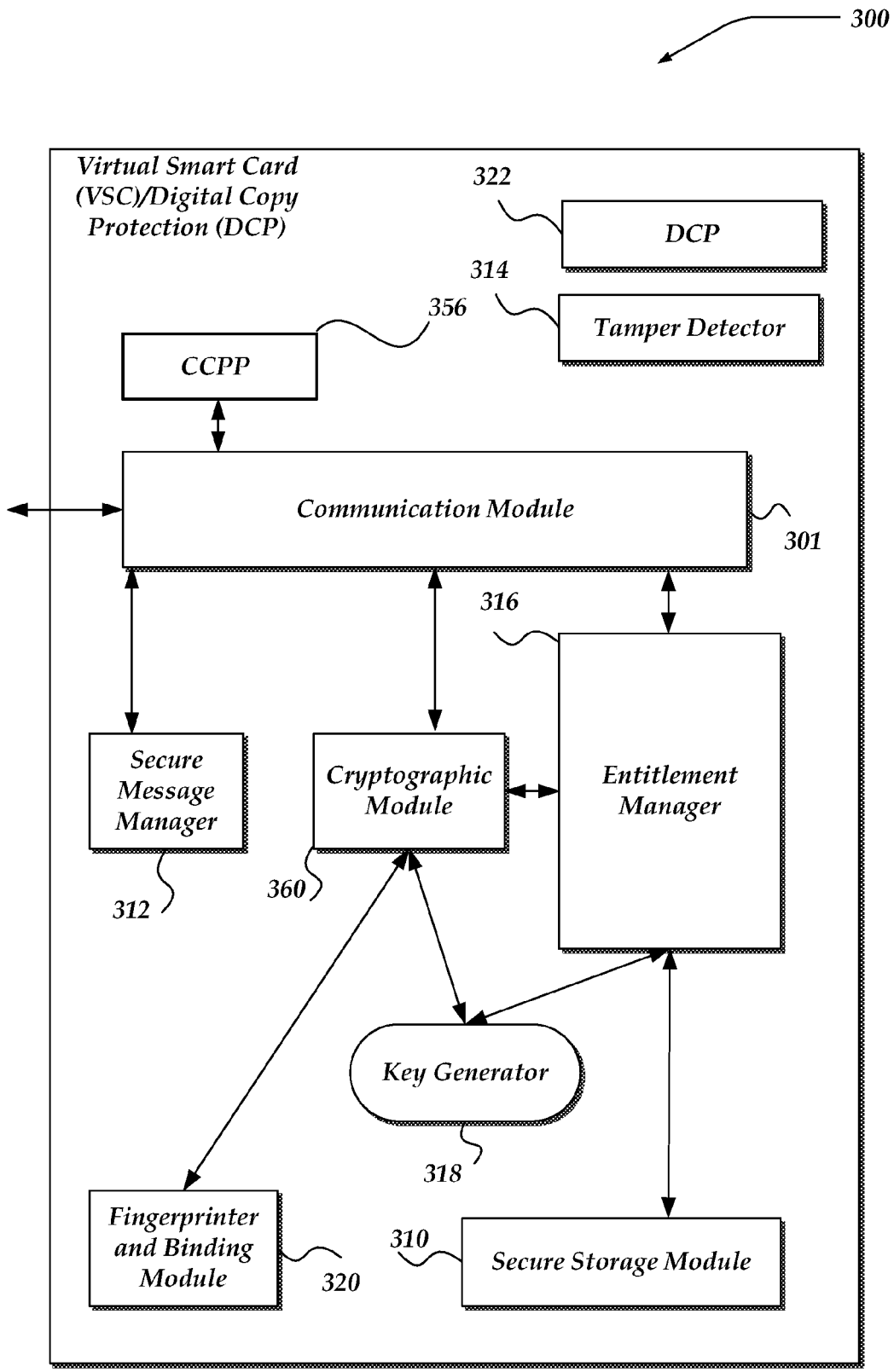
FIG. 3 illustrates one embodiment of a possible virtual smart card useable within the digital media device.

FIG. 3 illustrates one embodiment of a possible virtual smart card/Digital Copy Protection (VSC/DCP). VSC/DCP 300 of FIG. 3 may include many more components than those shown. The components shown, however, are sufficient to disclose an illustrative embodiment for practicing the invention, and variations in the arrangement and type of the components may be made without departing from the spirit or scope of the invention. Moreover, although VSC/DCP 300 is described, other downloadable conditional access system software modules may also be employed. For example, another VSC that may also be employed is described in more detail in U.S. Pat. No. 7,299,292, entitled "Process and streaming server for encrypting a data stream to a virtual smart card client system," which issued on Nov. 20, 2007, and which is incorporated herein in its entirety.

Use of VSC/DCP 300 enables privacy (confidentiality), integrity, timeliness, access control (authorization), and authentication (identity), rapid renewal, cross link copy protection or digital rights management, and greater capacity, flexibility, and an ability to bind to a device to provide increased security.

As shown, VSC/DCP 300 includes tamper detector 314, communication module 301, cryptographic module 360, entitlement manager 316, secure message manager 312, key generator 318, fingerprinter/binding module 320, DCP 322, secure storage module 310, and container and communications protocol proxy 356 (or simply proxy 356, or CCPP 356).

Secure storage module 310 is configured to provide a secure local store that may include containers tightly bound to the digital media device. Binding to the digital media device may be performed using, for example, a fingerprint, hash, or the like. Moreover, local security may be provided using encryption, obfuscation, or through use of various network resources. In one embodiment, secure storage module 310 may receive and securely store container decryption keys, or the like. In one embodiment, secure storage module 310, or the like, may be used to enable secure storage of decrypted containers received from container and communication protocol proxy 256 of FIG. 2 (and/or container and communication protocol proxy 356).

Fingerprinter/binding module 320 is configured to provide a fingerprint that uniquely identifies the digital media device. A fingerprint may be made up of a number of elements specific to each fingerprint. Such elements are termed herein as ridges. Each ridge includes an element of a fingerprint that provides information to the fingerprint making it unique from other fingerprints. Some examples of ridges include a hardware serial number, operating system version number, Internet Protocol address, physical memory size, and the like. Each ridge included within the fingerprint refines the identity of the system so that it may be uniquely identified within a system. The combinations of all fingerprints may create a handprint or system fingerprint that uniquely identifies a personal computer, server, client device, set top box, or similar device within the system. An order of each of the fingerprint groups and individual ridges may affect the resulting system fingerprint or handprint.

Key generator 318 is configured to employ cryptographic module 360 to enable generation of cryptographic keys. Such generation may employ for example, a rapid renewal mechanism whereby the new generation of keys may be performed within a short period of time, compared to traditional physical smart card key replacement mechanisms. In one embodiment key generator 318 may enable generation of new keys within hours rather than days, weeks, or even months. In one embodiment, to further obfuscate a potential point of attack dynamic rapid renewal is employed, wherein regeneration of keys, and the like, is performed on a random basis to create an unpredictable environment. In another embodiment, such dynamic rapid renewal may also be employed to replace various software components that may further minimize an attack. Employing such rapid renewal of enables use of VSC/DCP 300 in a variety of other situations, including banking, enterprise security, e-commerce, and by studios for content distribution, as well as managing streaming media container using container keys.

Tamper detection 314 may be applied at a variety of points within VSC/DCP 300 to ensure a highly secure infrastructure. Typically, some level of tamper protection or resistance may be provided as part of the software and/or hardware of VSC/DCP 300. As shown, tamper protection 314 may provide protection or resistance from tampering, and similar hacking approaches, including, but not limited to digital copy protection. Thus, in one embodiment, tamper detection 314 may operate as a DCP device. This protection may further include agents that are configured to perform various actions, including but not limited to in-circuit emulator detection, debugger detection, debugger resistance, memory space violation detection and protection, screen scrapper detection, audio scrapper detection, as well as similar application level piracy behavior detection and protection. It should be noted, however, that while tamper detection 314 may be configured to provide DCP, the invention is not so limited.

For example, in one embodiment, DCP 322 may be implemented as a separate component from tamper detection 314. As such, DCP 322 may be configured monitor for attacks on containers that might arise in the time between decryption and rendering when media is 'in the clear,' and also protecting against common static and dynamic attacks on the containers. Moreover, DCP 322 might further monitor activities based on rules allowing or disallowing the playout of encrypted containers. One embodiment of a possible implementation of DCP 322 might employ techniques such as are described in the pending U.S. patent application Ser. No. 11/150,357, entitled "Apparatus, System, And Method for Protecting Content Using Fingerprinting and Real-Time Evidence Gathering," filed Jun. 10, 2005, which is incorporated herein by reference. In that implementation, digital fingerprinting, pattern recognition, and real-time tamper evidence gathering are used to monitor for unauthorized access and to provide an appropriate response when such unauthorized access is detected. Digital fingerprinting may be based, at least in part, on a behavior of selected computer processes. A predetermined set of parameters associated with at least one process on a client device are monitored over time to detect a change in state. The state change is employed to create a fingerprint for the process. Statistical analysis is then applied to additional data collected to determine whether the additional data indicates unauthorized behavior. If such unauthorized attempts to copy or otherwise access the container is detected, a variety of actions may be performed, including, but not limited, to sending a message over a network to inhibit additional sending of a container, destroying a container currently received, or the like. It is noted, however, that the present invention is not limited to such non-exhaustive example implementation, and others may also be used for DCP 322.

In yet another embodiment, DCP 322 might be implemented as a distinct component separate from VSC/DCP 258 may also be provided to provide digital copy protection, in addition to tamper detection 314.

Tamper detection 314 may be configured to identify tampering from other systems, such as those on a digital media device, and the like. For example, in an interactive television environment it may be possible to deploy tamper detection within a network to monitor for cloning attempts of virtual smart cards and/or its various components. Tamper detection 314 may further provide a trusted time source, thereby preventing replay attacks.

Cryptographic module 360 is configured to provide a variety of cryptographic keys, including symmetric or private keys, asymmetric or public keys, and the like. Although cryptographic module 360 may employ virtually any cryptographic mechanisms, in one embodiment, cryptographic module 360 employs AES for symmetric cryptography. In another embodiment, cryptographic module 360 employs RSA for asymmetric cryptographic actions.

Secure message manager 312 is configured to provide a secure medium for message exchange. Although not illustrated, secure message manager 312 may interact with a variety of other components of VSC/DCP 300 as required to ensure that mutual authentication of end parties is accomplished and privacy of messages is maintained.

Entitlement Manager 316 is configured to manage the receipt, storage, sending, and interpretation of entitlements. As such, entitlement manager 316 may perform various actions associated with security control activities as described above. For example, token manager 316 may receive entitlement messages and manage the key acquisition, key transfer, key identification, rights validation, key decipher, and container decryption steps described above. Moreover, entitlement manager 316 may employ secure message manager 312 to enable secure communications between a server and the digital media device.

Communication module 301 is configured to enable communications of containers, and/or entitlements between VSC/DCP 300 and the digital media device, a network, or the like. Communication module 301 may then provide the container and/or entitlements to various components within VSC/DCP 300 for performance of various container security layer actions, as described in more detail above.

Where, container and communication protocol proxy 256 of FIG. 2 is distinct from VSC/DCP 258 of FIG. 2, in one embodiment, communication module 301 may be used to enable secure communications between proxy 256 and VSC/DCP 258 and/or with media player 254 of FIG. 2.

However, as shown, proxy 356 represents one embodiment on the invention where container and communication protocol proxy 256 in implemented within VSC/DCP 258. As noted elsewhere, such configuration is but one of a variety of configurations, and the invention should not be construed as being narrowed by such non-exhaustive example. As such, however, container and communication protocol proxy 356 is substantially similar to container and communication protocol proxy 256 of FIG. 2, except that it is configured and arranged to operate as a component within the VSC/DCP. Thus, in this embodiment, container and communication protocol proxy 356 is shown to communicate though communication module 301. However, in another embodiment, container and communication protocol proxy 356 might also be configured to communicate directly with one or more other components within VSC/DSP 300, without departing from the scope of the invention.

Generalized Operation

Figure 4:
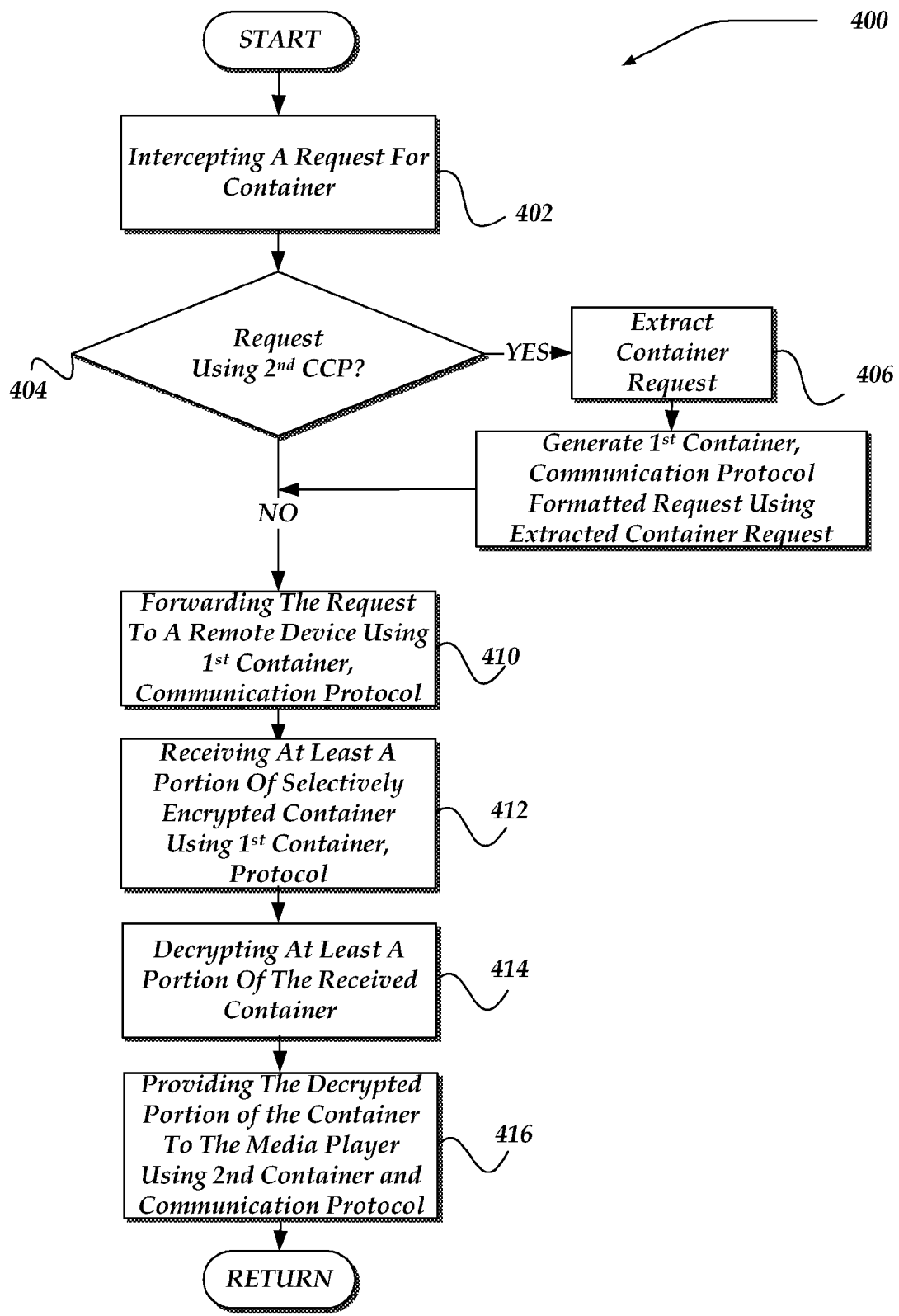
FIG. 4 illustrates a logical flow diagram generally showing one embodiment of a process for using a local container and communication protocol proxy to manage a secure progressive download of container with container and communication protocol conversions, in accordance with the present invention.

The operation of certain aspects of the invention will now be described with respect to FIG. 4. FIG. 4 illustrates a logical flow diagram generally showing one embodiment of a process for using a local container and communication protocol proxy to manage a secure communication of containers. Process 400 of FIG. 4 may be implemented within container and communication protocol proxy 256 of FIG. 2. In one embodiment, the local container and communication protocol proxy may receive FLV container requests from the media player in RTMP and convert it to HTTP requests for H.264 for transmission over the network. However, as noted, the invention is not so limited. Thus, process 400 is generalized to employ the container and communication protocol proxy to convert between a first container and communication protocol and a second container and communication protocol, of which these containers and communication protocols may include, but are not limited to the container types and communication protocols mentioned above.

Process 400 begins, after a start block, at block 402, where the container and communication protocol proxy may be configured to intercept from a media player component a second container and communication protocol request. In another embodiment, a user of the client device in which the container and communication protocol proxy and media player resides, might employ a browser to connect to a content server using a first communication protocol, such as HTTP. Thus, in one embodiment, the request might use the first communication protocol. The browser might display a web page that includes a link, or the like, useable for selecting a container for download. When the user clicks on the link, the browser might be arranged to re-route the link to the container and communication protocol proxy. Thus, in one embodiment, the request may be received from the media player; however, in another embodiment, the request may be redirected to the container and communication protocol proxy by a script, applet, or the like, within the browser, on the displayed web page from the container server, or the like.

Processing moves to decision block 404, where a determination is made whether the received request for container is in the second container and communication protocol format. If so, processing branches to block 406; otherwise, processing flows to block 410.

At block 406, where information about the container being requests is extracted from the second communication protocol formatted request. Processing then flows to block 408, where the extracted information is then used to generate a first protocol formatted request for the container. Processing flows next to block 410.

It is noted that in one embodiment, where the web page is displayed by the container server, the content server might receive the request for the container through the web page, as HTTP, or other first protocol format. Thus, in that embodiment, the container and communication protocol proxy might not intercept the request and re-route it to the container server. Therefore, block 402 might not be performed, and instead, process 400 would instead flow to block 410 where the request from the web page is directly sent as a first container and communication protocol formatted request. However, in another embodiment, independent of how the request is initially formatted and/or from which component within a digital media device the request may be "intercepted" and analyzed to determine the format protocol being used. Thus, the invention should not be construed as being limited to a single analysis approach and a plurality of approaches is useable, without departing from the scope of the invention.

In any event, processing moves next to block 412, where the content server provides the container using the first container and communication protocol format to the client device. In one embodiment, the container is in the H.264 file format. However, the invention is not limited to this file format, and others may also be employed. In one embodiment, the container is selectively encrypted. In one embodiment, the container is streamed to the client device, such that some of the container may be received for decrypting and playing on the client device, while another portion is still being downloaded to the client device, or is otherwise not yet received by the client device. As noted above, such downloading of the container may be performed using any of a variety of mechanisms, including, but not limited to random access, adaptive streaming, progressive downloading, real-time streaming, or the like. In one embodiment, the container and communication protocol proxy is configured to request a change in the mechanism used for streaming or otherwise downloading of the container. Thus, the container and communication protocol proxy may select to dynamically change the mechanism for downloading of the container based on various criteria.

For example, in one embodiment, the container and communication protocol proxy might be configured and arranged to monitor network conditions over which the container is received and dynamically modify the downloading based on some predefined criteria of the network conditions. Such network conditions may include, but are not limited to bandwidth changes, packet failures, number of network disconnects, or the like. The invention is not limited to merely monitoring network conditions, however, and a variety of other approaches may be used. For example, in another embodiment, the container/communication protocol proxy may be configured and arranged to monitor various states of a buffer to which the container may be provided. If the buffer is detected to have some defined state, such as container exceeding or dropping below a threshold level within the buffer, or the like, then the container and communication protocol proxy may modify the download mechanism being used. In one embodiment, the proxy might change the downloading mechanism by sending a message to the server to request that the downloading mechanism be changed to another mechanism.

In another embodiment, based on some condition, the container and communication protocol proxy may select to modify a quality of the container being received. For example, the container and communication protocol proxy might send a request to the server sending the container, to change at least a first portion of the container being transmitted to be compressed or otherwise encoded at a different value than a previous portion of the container. For example, if the container and communication protocol proxy determines, for example that a buffer condition is detected, and/or a network condition is detected then the container and communication protocol proxy might request that a next portion of the container be sent encoded at a different definition level. For example, the encoding might be changed from a high definition level (HD) level to a lower level of quality, such as a standard definition (SD) level (or vice versa).

It should be understood, that multiple condition may be used, even providing multiple thresholds useable to vary the encoding or compression of portions of the data and thereby modify the quality of the container being received. Thus, when the conditions vary, the quality of different portions of the container may dynamically vary for a given container stream. Therefore, the quality of different portions of a given container stream may vary over time based changes in monitored conditions. Moreover, the invention is not limited to merely changing a mechanism used for sending the container or a quality of the container. For example, the proxy may be configured to modify both the quality and the download mechanism, or even to vary which one to employ based on different conditions.

In any event, the container and communication protocol proxy receives the stream selectively encrypted container from the container server. In one embodiment, the received selectively encrypted container may be securely stored until requested for play by the media player, or otherwise provided to the media player, deleted, or the like.

Moving to block 414, the container and communication protocol proxy, or another component, may then decrypt at least a portion of the received container. Flowing next to block 416, the container and communication protocol proxy, or other component, provides the decrypted container to the media player using the second container and communications protocol. In one embodiment, the decrypted container may be stored in a secure data store of the container and communication protocol proxy, VSC, or the like. Thus, the decrypted container is unavailable for improper usage.

In one embodiment, the moment a portion of the container is received, the container and communication protocol proxy or other component, may begin to decrypt it, and provide it to the media player using the second container and communication protocol. Thus, in one embodiment, the invention enables almost immediate playing of the received container by the media player without having to wait for the entire container to have been received. Moreover, if the media player requests to seek another point in the container, such as might arise through, for example, fast-forwarding, or the like, the invention may satisfy this request as well. Upon completion of block 416, processing returns to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for managing multimedia content over a network, comprising:
   a media player residing on a client device and configured to receive containers having content using a Real Time Messaging Protocol (RTMP) protocol, and to perform actions, including:
      sending an RTMP formatted request for a container of content; and
   a container and communication protocol proxy component residing on the client device and configured to perform actions, including:
      intercepting on the client device the RTMP formatted request from the media player;
      extracting from the RTMP formatted request information about the container being requested;
      generating a HyperText Transfer Protocol (HTTP) formatted request for the container being requested based on the extracted information;
      sending the HTTP formatted request over the network using HTTP;
      receiving on the client device at least a portion of the requested container streamed over the network using HTTP, wherein the at least a portion of the requested container is selectively encrypted;

enabling decryption of the at least some of the received portion of the selectively encrypted container, such that the decrypted container is then provided to the media player using RTMP, wherein the media player is configured and arranged to play at least the received portion of container while another portion of the container is currently unavailable to the media player.

2. The system of claim 1, wherein the container is in at least one of a Flash Video (FLV) file format, Windows Media Video Format (WMV), Windows Media Audio Format (WMA) Advanced Systems Format (ASF), or a Real Audio (RA/RAM) file format.

3. The system of claim 1, the system further comprising:
a component configured and arranged to perform digital copy protection of the container, such that if an unauthorized attempt to copy the container is detected, the component may inhibit access to the container.

4. The system of claim 1, wherein the HTTP formatted request is sent over the network to an HTTP server.

5. The system of claim 1, wherein the container is received using one of a progressive downloading, a real-time streaming, an adaptive streaming mechanism, or modifying a quality of the requested container.

6. The system of claim 1, wherein the system resides within a digital media player.

7. A virtual smart card system residing with a client device for managing access to container over a network, the virtual smart card comprising:
a communication module that is configured and arranged to receive and to send information;
a cryptographic module that is configured and arranged to receive encrypted container and to decrypt the container; and
a container and communication protocol proxy module that is configured and arranged to convert between a first container and first communications protocol and a second container and a second communications protocol by performing actions, including:
if a request for content originating on the client device employs the second container and second communications protocol, reformatting the request as a first container and first communications protocol request for content;
sending the first container request for the content over the network towards a server that is configured to employ the first communications protocol and to provide content using the first container;
receiving on the client device at least a portion of the requested content over the network using the first container and first communications protocol, wherein the at least a portion of the requested first container is selectively encrypted;
providing at least some of the received portion of the selectively encrypted content to the cryptographic module such that the received portion is decrypted; and
providing the decrypted content to a media player using the second container and second communications protocol, wherein the media player is configured and arranged to play at least the received portion of content using the second container while another portion of the content is currently unavailable to the media player.

8. The virtual smart card system of claim 7, wherein the virtual smart card further comprises a secure storage module that is configured and arranged to receive and store containers.

9. The virtual smart card system of claim 7, further comprising:
a digital copy protection component that is configured and arranged to monitor for an unauthorized access of the received-container.

10. The virtual smart card system of claim 7, wherein the content is provided in a Flash Video file format.

11. The virtual smart card system of claim 7, wherein the request for container is intercepted from one of a media player component or a web browser application.

12. The virtual smart card system of claim 7, wherein the first communications protocol and the second communications protocol are different communications protocols selected from at least one of a HyperText Transfer Protocol (HTTP), Real Time Messaging Protocol (RTMP), MPEG, or RTMPE (RTMP encrypted) communications protocol.

13. A computer-readable storage medium that includes data and instructions, wherein the execution of the instructions on a client computing device provides for managing access to container over a network by enabling actions, comprising:
if a request for content executed on the client device employs a second container and second communications protocol:
intercepting on the client device the second communications protocol formatted request, and
formatting on the client device the request as an first container and first communications protocol request for content;
sending the content request for the first container over the network towards a server configured to communicate using the first communications protocol;
receiving on the client device at least a portion of the requested content using the first container streamed over the network using the first communications protocol, wherein the at least a portion of the requested content is selectively encrypted;
decrypting the at least some of the received portion of the selectively encrypted content; and
providing the decrypted content to a media player executing on the client device using the second container and second communications protocol, wherein the media player is configured and arranged to play at least the received portion of second container while another portion of the second container is currently unavailable to the media player.

14. The computer-readable storage medium of claim 13, wherein the instructions enable actions, further comprising:
if the request container employs the first container and first communications protocol, sending the first container and first communications protocol formatted request over the network, independent of intercepting the request.

15. The computer-readable storage medium of claim 13, wherein the selectively encrypted container is received using at least one of an adaptive streaming mechanism or a real-time streaming mechanism.

16. The computer-readable storage medium of claim 13, wherein the received container employs a Flash Video (FLV) file format, or an MPEG file format.

17. A method for managing access to a container over a network, comprising:

intercepting a second communications protocol formatted request for content in a second container using a protocol converter proxy that is local to a client device;

generating a first communications protocol formatted request using a first container for the content being requested based on the intercepted second communications protocol formatted request using the local proxy that is local to the client device;

sending, by the local proxy, the first container and first communications protocol formatted request over the network using the first communications protocol;

receiving, at the local proxy, at least a portion of the requested content using the first container streamed over the network using the first communications protocol, wherein the at least a portion of the requested content is selectively encrypted;

decrypting of the at least some of the received portion of the selectively encrypted content; and providing the decrypted content to a media player using the second container and second communications protocol, wherein the media player is configured and arranged to play at least the received portion of second container while another portion of the second container is currently unavailable to the media player.

18. The method of claim 17, wherein the intercepted second communications protocol formatted request is intercepted from at least one of a media player or a browser application.

19. The method of claim 17, wherein the received portion of the container is configured using a Flash Video file format.

20. The method of claim 17, wherein at least a portion of the method is implemented within a virtual smart card that is configured and arranged to execute the portion of the method.

21. The method of claim 17, wherein receiving at least the portion of the requested container further comprises receiving the container streamed using at least one of an adaptive streaming mechanism, a progressive downloading, or a real-time streaming mechanism.

* * * * *